United States Patent [19]

Weber

[11] Patent Number: 4,682,669

[45] Date of Patent: Jul. 28, 1987

[54] TRANSPORTABLE HYDRAULIC SEISMIC TRANSDUCER

[75] Inventor: Richard M. Weber, Prosper, Tex.

[73] Assignee: Texas Instruments Incorporated, Dallas, Tex.

[21] Appl. No.: 830,487

[22] Filed: Feb. 18, 1986

Related U.S. Application Data

[63] Continuation of Ser. No. 465,399, Feb. 10, 1983, abandoned.

[51] Int. Cl.$^4$ .................... G01V 1/09; H04R 11/00
[52] U.S. Cl. .................. 181/114; 367/189; 92/170; 92/171
[58] Field of Search ............ 73/662, 665; 181/113, 181/114, 118, 119, 120, 121; 367/189, 190; 92/170, 171

[56] References Cited

U.S. PATENT DOCUMENTS

| | | | |
|---|---|---|---|
| 3,306,301 | 2/1967 | Bays | 367/189 X |
| 3,929,206 | 12/1975 | Bedenbender et al. | 181/113 X |
| 3,979,715 | 9/1976 | Hufstedler et al. | 181/121 X |
| 4,388,981 | 6/1983 | Fair | 367/189 X |
| 4,450,928 | 5/1984 | Weber et al. | 181/119 X |

FOREIGN PATENT DOCUMENTS 0612196  6/1978  U.S.S.R. ................. 181/119

Primary Examiner—Deborah L. Kyle
Assistant Examiner—Brian S. Steinberger
Attorney, Agent, or Firm—Thomas G. Devine; James T. Comfort; Melvin Sharp

[57] ABSTRACT

A transportable hydraulic seismic transducer has a seismic energy source connected to a pad for imparting elastic waves to the underlying ground. The energy source has a reaction mass with a single diameter cylinder formed therein, a double ended piston reciprocally mounted in the cylinder with a piston rod extending from opposite ends of the piston and a pair of bushings fitted within the cylinder at opposite ends to provide bearing surfaces for the opposite ends of the piston rod. A piston may be ringed and a liner fitted into place within the cylinder with the rings forming a seal with the liner. The piston may also be ringless and a liner made of a bushing material fitted within the cylinder so that between the piston and the liner, an adequate seal is provided. The use of the single diameter cylinder or bore permits the total machining of inserted parts such as the bushings and liners to be done before inserting in the reaction mass bore.

4 Claims, 5 Drawing Figures

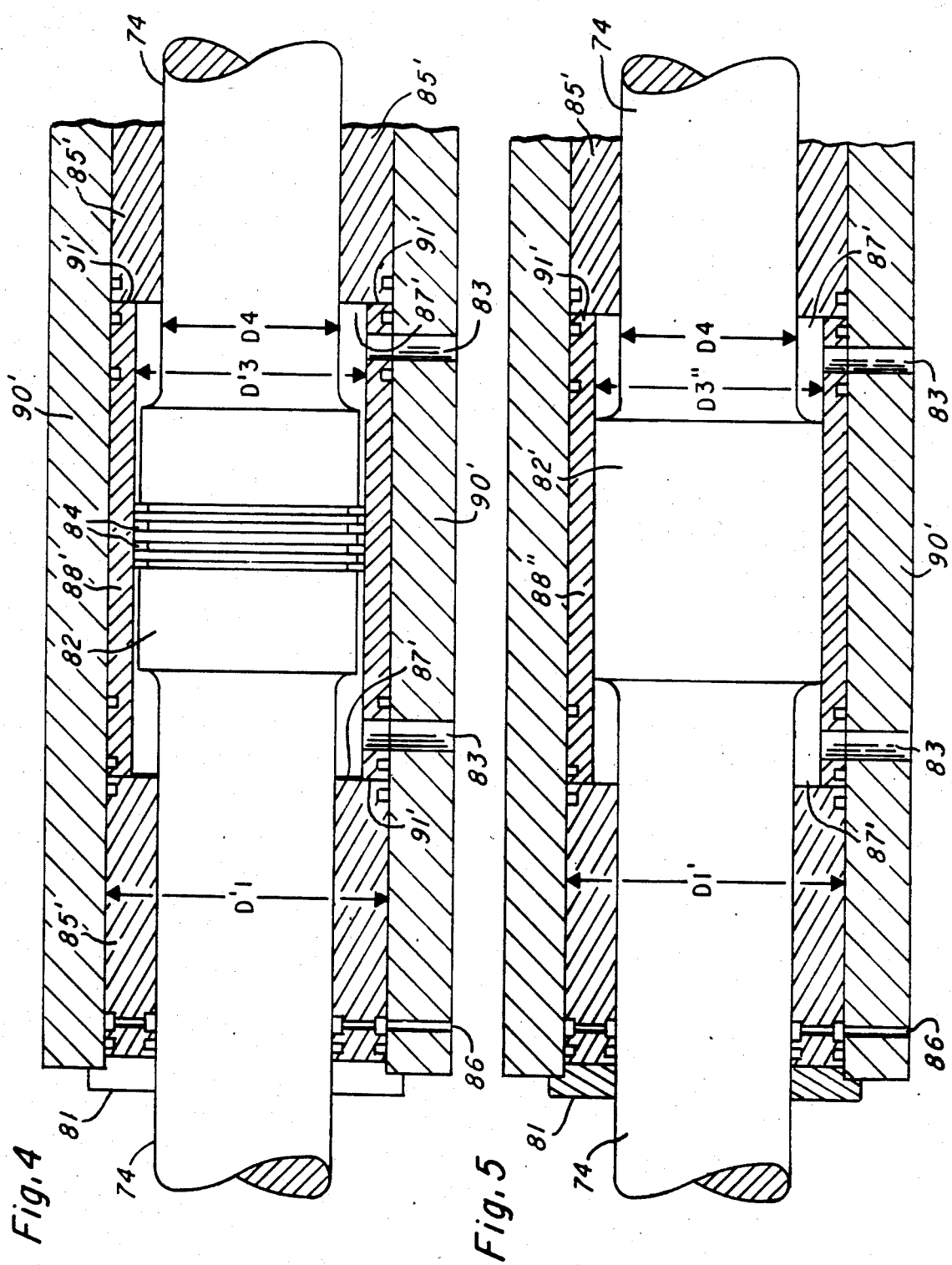

TRANSPORTABLE HYDRAULIC SEISMIC TRANSDUCER

BACKGROUND OF THE INVENTION

1. Field of the Invention

This invention relates to transportable hydraulic seismic transducers and more particularly to the seismic energy source attached to a transport and to a pad for imparting elastic waves to the underlying ground.

2. Description of the Prior Art

In the prior art, the conventional hydraulic actuator of a seismic vibrator consists of several parts. The reaction mass is a main element which has a double acting hydraulic actuator housed inside. In addition, a reaction mass is used as an inertial element for the developed force to act upon. The reaction mass is machined internally to house a piston, piston rods, a liner and rod bushings. Also, seals at the end of the actuator and piston rings are required.

The piston rods run on the rod bushings which provide a bearing surface. The bearing surface is lubricated by hydraulic fluid passing from the actuator cavity to the rod seal area.

The pressure on opposite faces of the piston are sealed from each other by the piston rings. The rings form a very low leakage path by slidably sealing the gap between the inner diameter of the liner and piston outer diameter.

The liner is a sacrifical surface on which the piston rings slide. When the rings of the liner are worn, they are replaced. The liner is shrunk fit (liquid nitrogen) into a machined hole in the reaction mass and then bored to its proper inner diameter.

The reaction mass has several different internal machined features. From both ends, a desired diameter bore is machined. Then a second diameter bore, generally smaller, which contains the liner and the piston is machined to connect the bores at the ends. It is of the utmost importance that these three bores have the same center. It is essentially impossible to achieve that ideal and the deviation must be accounted for in the mating parts. Also, the mating parts which have different diameters suffer the same problem.

The concentricity of the three bores is required to be less than some specified upper bound. To insure proper performance, the tolerances and the concentricities of the parts are specified and the resultant fabrication costs are quite high.

By using a single diameter bore, this invention does away with a great deal of the expense and inherent inaccuracies of the above described prior art.

BRIEF SUMMARY OF THE INVENTION

A transportable hydraulic seismic transducer has a seismic energy source connected to a truck, and to a pad for imparting elastic waves to the earth. The source has a reaction mass and the reaction mass has a single diameter bore therethrough, the bore forming a cylinder in which a double acting piston is reciprocally mounted. The piston has opposite faces with a piston rod extending from each of the opposite faces. A bushing is located at each side of the bore to provide a bearing surface for each of the piston rods. A liner is provided to provide a seal between the inside diameter of the liner and the rings of a ringed piston or the piston itself when rings are not provided. When rings are provided, the liner material is generally of a substance that is harder than that of the rings so that the rings wear faster and may be replaced without replacing the liner. When rings are not used, the liner may be of a bearing material such as bronze to provide a bearing surface for the piston under worst case conditions. Such worst case conditions may include extreme bushing wear causing the piston to contact the liner.

The principal object of this invention is to provide a transportable hydraulic seismic transducer having a seismic energy source with a single diameter cylinder formed therein to permit a premachined liner to be inserted along with premachined bushings into the cylinder to provide proper diameters for the source piston and piston rods, respectively.

Another object of this invention is to enable easy and speedy repair of the seismic energy source of a transportable hydraulic seismic transducer by permitting easy removal and installation of the liner and bushings.

These and other objects will be made evident in the detailed description that follows.

BRIEF DESCRIPTION OF THE DRAWINGS

FIG. 4 is a cross section of the seismic energy source of this invention in which the piston is provided with piston rings.

FIG. 5 is a cross section of the seismic energy source of this invention in which the piston is ringless.

DETAILED DESCRIPTION OF THE INVENTION

A transportable hydraulic seismic transducer has a seismic energy source whose reaction mass has a single diameter bore therethrough. The single diameter bore, as will be shown in detail, eliminates the need for exacting procedures to maintain concentricity of multiple bores. Also, a liner may be machined and then inserted into the bore to establish a seal between the piston rings and the liner, in one embodiment. The piston rod bushings are also inserted into the bore from opposite ends. End caps are secured on both ends of the bore to secure the bearings and liner in place. This configuration thus makes assembly very simple and straightforward as compared to the prior art.

Also, when a catastrophic fault occurs, such as a liner being broken or excessively worn, the end caps are removed, the bushings and piston are removed, and the broken or worn liner then removed. A new liner, machined and dimensioned as desired is then reinserted, the piston reinstalled and the bushings and end caps completing the assembly.

In the prior art, the end caps are removed, then the rod bushings and piston. The removal of a broken or worn liner then requires the expertise of a machine shop. A new liner is then inserted into the bore with the liner shrunk through the application of liquid nitrogen, and then permitted to expand to force fit into the center diameter bore. The bores into which the bushings fit are of a different diameter. Then the liner is machined to the desired dimension, and within the rigorous limits of concentricity.

As will be shown, the abuttment of the bushings to the liner in this invention provides a hydraulic stop. In the prior art, the hydraulic stop had to be machined into the appropriate parts.

Figure 1:
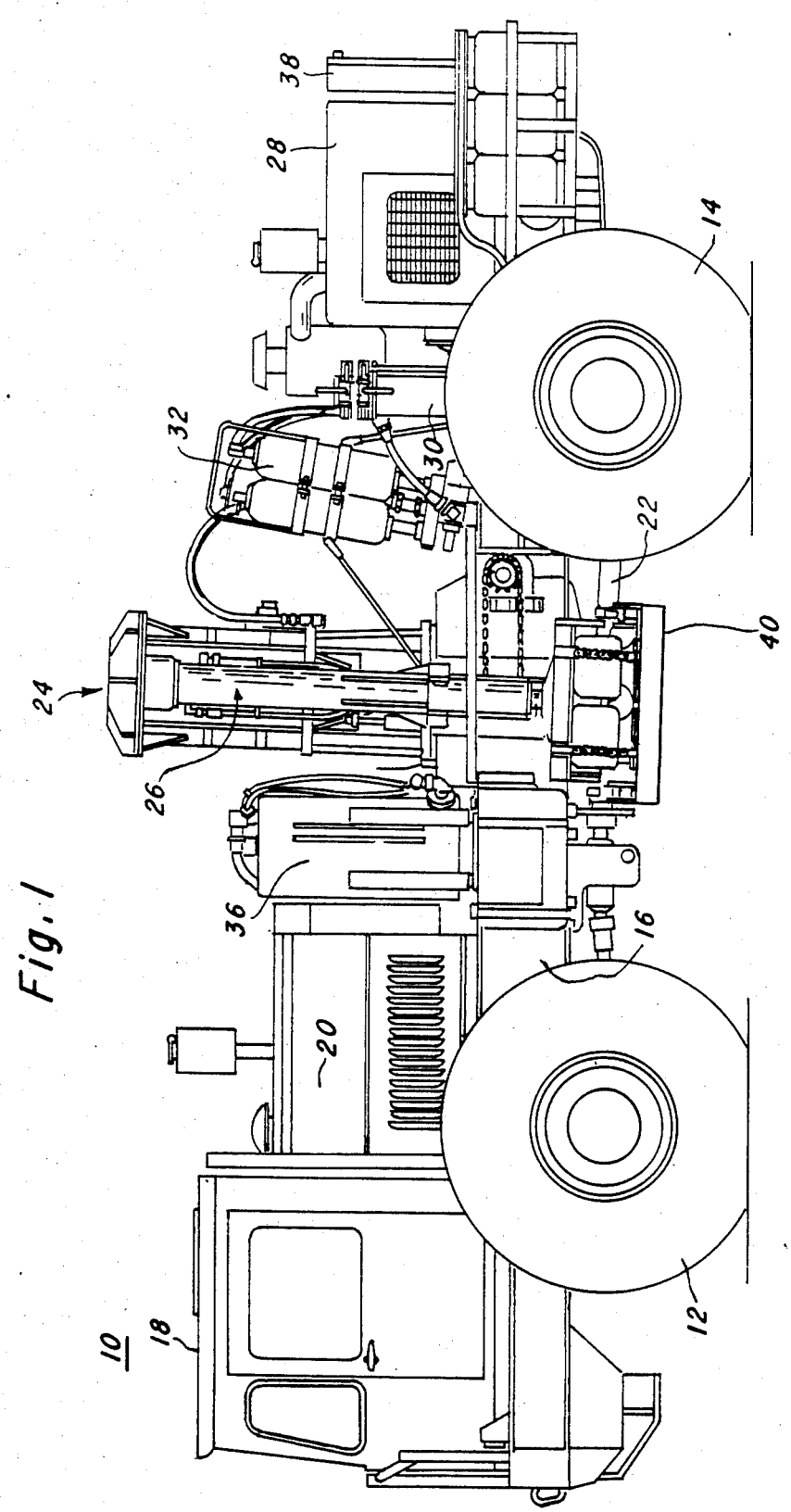
FIG. 1 is a side view of the seismic source mounted on a truck.

With these important advantages over the prior art in mind, please refer first to FIG. 1. A truck 10 has front and rear wheels 12 and 14 respectively, which support a chassis comprised of frame channels 16, a cab 18 and an engine 20. The engine 20 is connected to drive the rear wheels 14 by a drive train including drive shaft 22. The seismic energy source 24 is disposed between the front and rear wheels 12 and 14 and connected to the frame members 16 of the truck by a hydraulic lift system 26. The hydraulic system for the seismic source includes the prime mover or engine 28, main hydraulic pump 30, high pressure accumulator system 32, low pressure accumulator system (not shown but located behind the high pressure accumulator system), hydraulic fluid tank 36, hydraulic fluid cooler 38, and associated hydraulic plumbing. The hydraulic system may be located on the frame members 16 of the vehicle as shown in this FIG. 1.

The electronic controls are located in cab 18 and not shown in FIG. 1. The control system is described in U.S. Pat. No. 3,929,206, entitled "Servo Hydraulic Transducer and Method of Operation" which is assigned to the assignee of this invention and incorporated herein by reference. Also in the prior art is an electronic control for the signal that causes the source to vibrate. This is described in U.S. Pat. No. 3,979,715, entitled "Method and System for Achieving Vibrator Phase Lock", which is assigned to the assignee of this invention and incorporated herein by reference.

Figure 2:
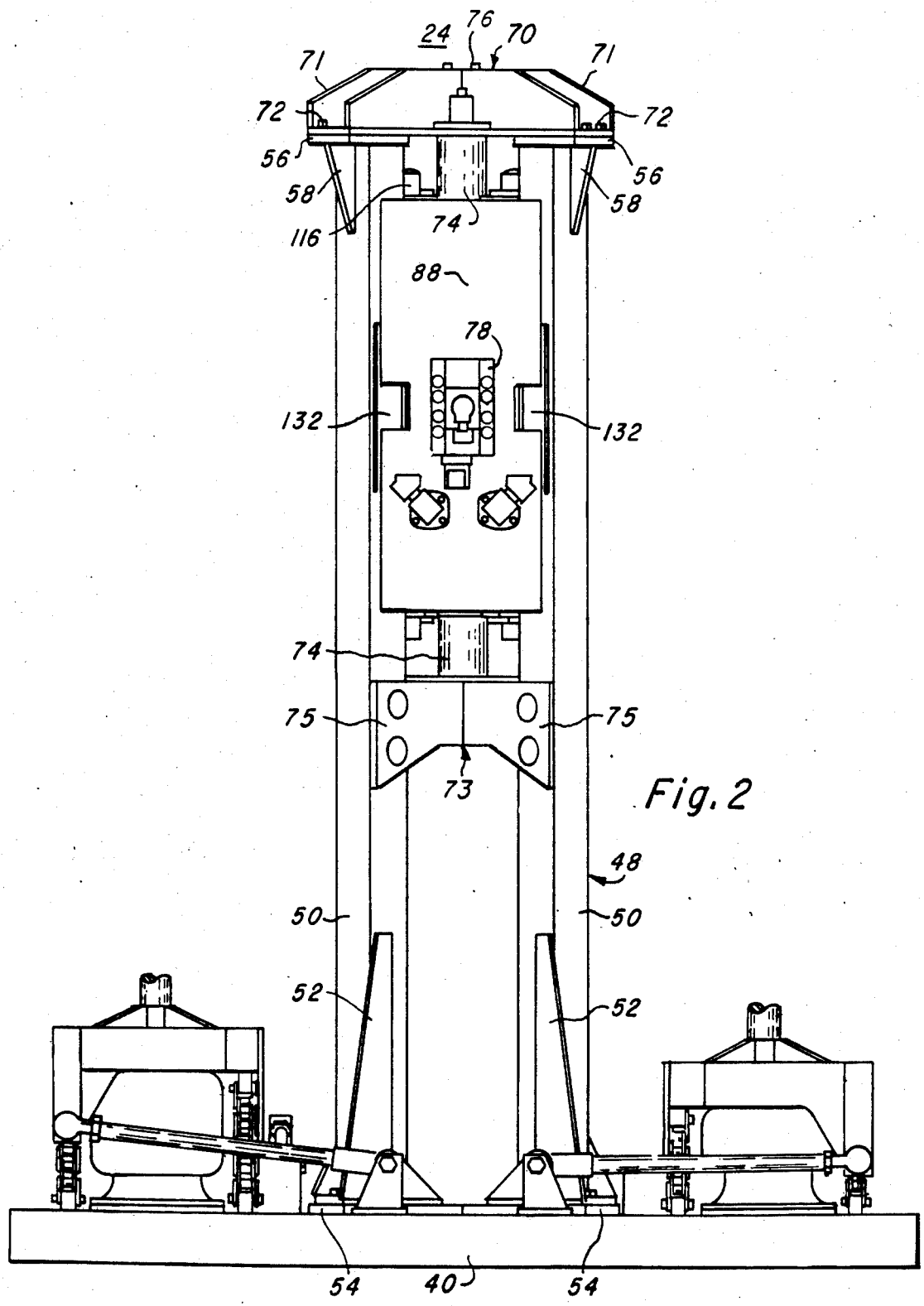
FIG. 2 is an end view of the transportable hydraulic seismic transducer showing in greater detail the truck mounted seismic energy source of FIG. 1.

The source 24 of FIG. 2 includes a baseplate or ground pad 40 which may be fabricated in any suitable manner to provide a flat lower baseplate surface. A vibrator frame 48 comprising four vertically disposed frame members 50 extends upwardly from the baseplate 40 to a point well above the vehicle drive shaft 22 (FIG. 1). The lower halves of the four frame members 50 are reinforced by gusset plates 52. Bottom foot plates 54 are connected to the four vertical members of the frame 48 and the frame is bolted or otherwise attached to the baseplate or ground pad 40. Top plates 56 are connected to the tops of frame members 50 and are braced by gusset plates 58.

An upper cross member 70 is formed by intersecting channels 71. The outer ends of the channels 71 are bolted to their respective top plates 56 by bolts 72. The inner section of the upper cross member 70 is adapted to receive the upper end of a double-ended piston with rods 74. The upper end of the rod of the double-ended piston member 74 is securely connected to the intersection of the cross member 70 by a plurality of bolts or screws 76.

A lower cross member 73 is constructed similarly to the upper cross member 70 in that it comprises intersecting cross members 75 having their outer ends welded to points intermediate the four transducer frame forming vertical members 50.

Figure 3:
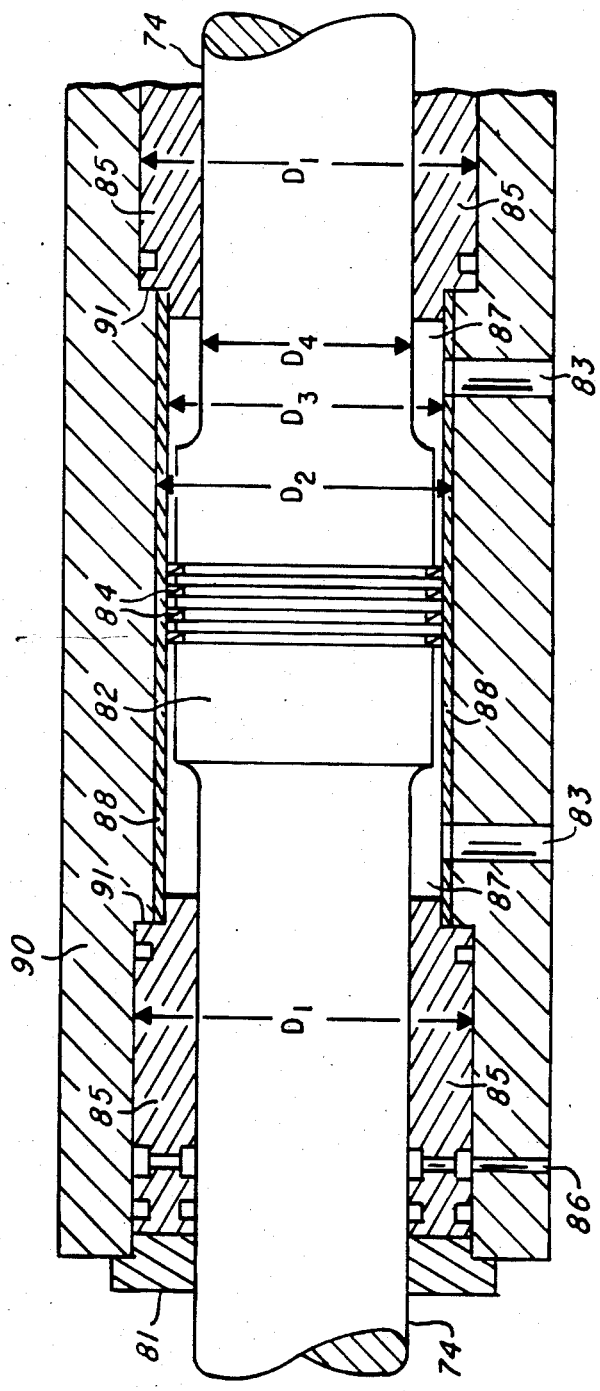
FIG. 3 is a cross section of a prior art seismic energy source.

FIG. 3 is a cross section of a prior art seismic energy source. Liner 88 is shrunk fit within reaction mass 90 at diameter D2. Bushings 85 are fit within reaction mass 90 at diameter D1.

Piston 82 with piston rings 84 fit within liner 88 at diameter D3. Piston rods 74 fit within bushings 85 at diameter D4. End cap 81 is shown at the left securing bushing 85. An end cap (not shown) is also connected to mass 90 at the right end securing bushing 85 on that end as well.

In this prior art embodiment, it is readily apparent that diameter D1 is bored from each end of the source and diameter D2 is bored at the center section. These three bores must be concentric within certain tolerances. This requires precision machining. If liner 88 must be removed, the end caps 81 and bushings 85 are removed to permit removal of the piston 82 and piston rods 74. Then liner 88 is machined out. As indicated earlier, a new liner 88 is shrunk by cooling in a substance such as liquid nitrogen, then inserted into the diameter D2 and permitted to expand. Next, the diameter D3 must be machined precisely.

FIGS. 4 and 5 are cross sections of alternate embodiments of this invention. Similar numbering is used within FIGS. 3, 4 and 5 for comparison purposes and for ease of understanding. A prime designation is used when a clear distinction is to be noted. FIG. 4 illustrates piston 82 with piston rings 84 within liner 88' at diameter D3. Bushings 85' are shown inserted at each end of mass 90'. Note that a single diameter D1' is bored through mass 90' in each of the embodiments of FIGS. 4 and 5. Piston rods 74 fit within bushings 85' at diameter D4 as in FIG. 3.

FIG. 5, it should be noted, incorporates a design where the piston 82' is ringless. The length of piston 82' and the clearance between piston 82' and liner 88" is such that fluid leakage between high pressure inlets 83 is minimal. Also, in the embodiment of FIG. 5, liner 88" is made of a bearing material such as bronze. This material is employed to prevent excessive wear on piston 82' in the event that the bushings 85' and piston rod 74 wear with respect to each other so that piston 82' actually touches and rides on liner 88".

On the other hand, with respect to FIG. 4 (and FIG. 3 as well), rings 84 are made of a material that is softer than that of liner 88' (88 in FIG. 3) so that the rings 84 tend to wear more than liner 88' (88 in FIG. 3).

Not shown are those embodiments which do not employ liners 88' or 88", relying on the material of mass 90'.

At junction 91' between liner 88' of FIG. 4 (88" of FIG. 5) and bushing 85', a volume 87' is formed when piston 82 moves toward bushing 85' and past inlet port 83. The trapped volume of oil serves as a cushion to prevent the piston 82 from striking bushing 85'.

When repairs are required in either of the embodiments of FIGS. 4 or 5, it is a simple matter to remove end caps 81, bushings 85', the piston 82 with piston rods 74. This permits easy removal of the liner 88' or 88" because they are not shrunk fit into diameter D3'. If replacement of the liners 88' or 88" is required, the parts that have been previously machined to fit within diameter D1' and to have an inside diameter of D3' (D3" in FIG. 5) are installed. The other parts are then reinserted and end caps 81 are installed to hold the assembly in place. This ease and accuracy of manufacture permits greater tolerances on parts and far greater flexibility in replacing parts.

It is contemplated that various materials may be used to implement this invention, single ended rather than double ended pistons may be employed, and piston liners may or may not be employed. This invention is limited only by the appended claims.

I claim:

1. A transportable hydraulic seismic transducer comprising:

(a) a transport means for transporting the hydraulic seismic transducer;

(b) a pad for imparting elastic waves to the underlying ground;

(c) a seismic energy source attached to the transport means and to the pad, the source having a reaction mass with a single diameter cylindrical bore extending entirely therethrough, an actuator rod comprising a piston and at least one piston rod having a diameter less than said piston located within the bore, and at least one bushing premachined before insertion into the bore, fixed within the bore and having an inside diameter of a size to provide a bearing surface for the piston rod;

(d) a cylindrical liner premachined before insertion into the bore, fitted within the bore, having an inside diameter of a size to accommodate the piston, wherein the piston is ringless and the liner is comprised of a bushing material; and (e) hydraulic system means operatively connected to the seismic energy source for causing the source to vibrate at desired frequencies.

2. The transducer of claim 1 wherein an internal hydraulic stop is formed by butting the bushing against the liner, thereby trapping hydraulic fluid between the piston and the bushing.

3. A seismic energy source comprising:

(a) a reaction mass having a single diameter cylinder formed therein and extending entirely therethrough;

(b) a double ended piston reciprocally mounted in the cylinder, and a piston rod having a diameter less than said piston extending from opposite ends of the piston to project from the reaction mass;

(c) a cylindrical liner, premachined before insertion into the bore, fitted within the cylinder having an inside diameter of the size to accommodate the piston, wherein the piston is ringless and the liner is comprised of a bushing material; and (d) a pair of bushings each premachined before insertion into the bore fitted within the cylinder at opposite ends thereof and each bushing having an inside diameter to provide a bearing surface for the opposite ends of the piston rod, respectively.

4. The source of claim 3 wherein an internal hydraulic stop is formed by butting the bushings against the liner, thereby trapping hydraulic fluid between the piston and each bushing.

* * * * *